United States Patent Office 3,698,936
Patented Oct. 17, 1972

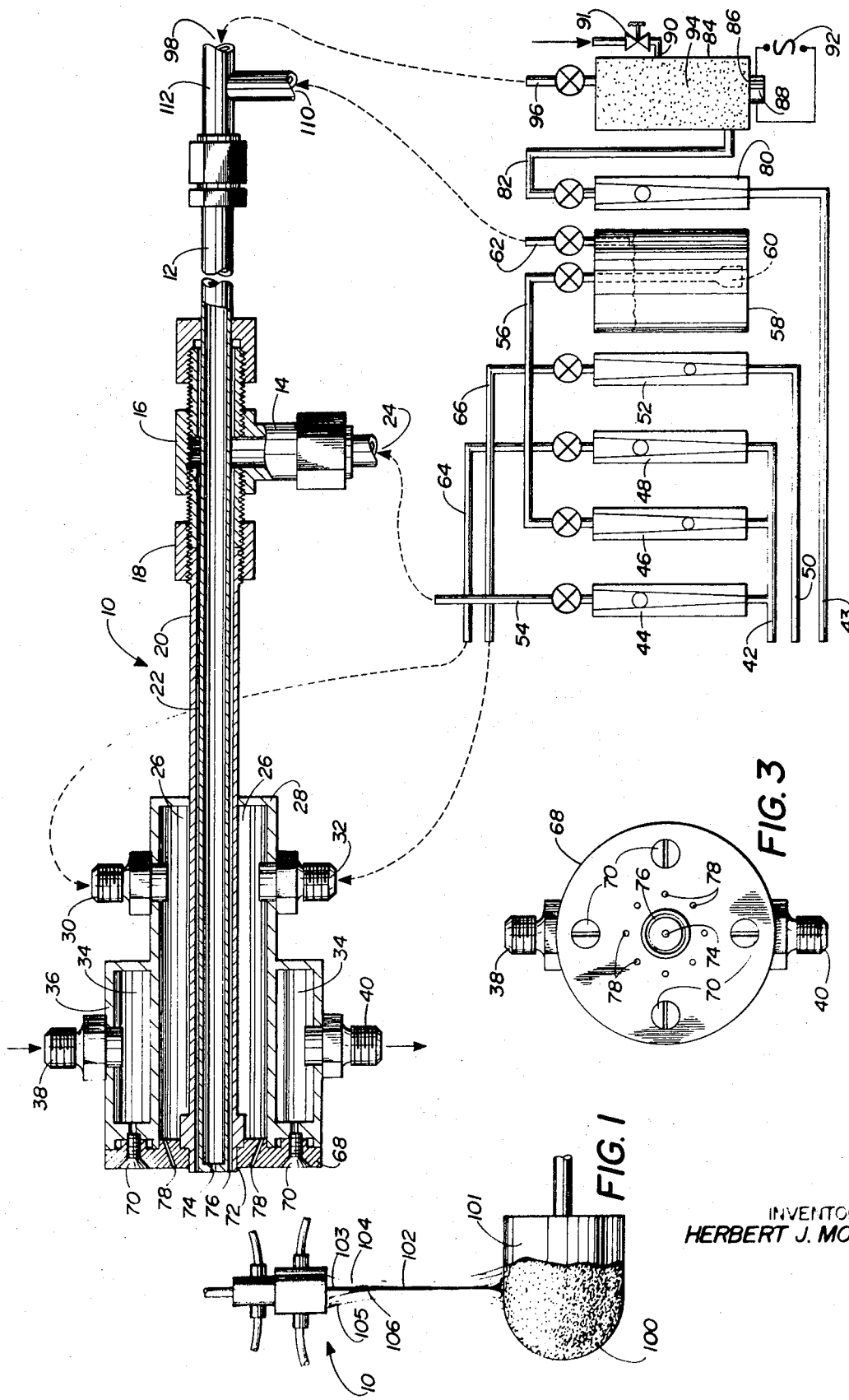

3,698,936
PRODUCTION OF VERY HIGH PURITY METAL
OXIDE ARTICLES
Herbert J. Moltzan, Dallas, Tex., assignor to Texas
Instruments Incorporated, Dallas, Tex.
Filed Dec. 19, 1969, Ser. No. 886,628
Int. Cl. B44d 1/08
U.S. Cl. 117—105.2
12 Claims

ABSTRACT OF THE DISCLOSURE

Very high purity metal oxide articles are produced by a process wherein a finely divided elemental metal is fluidized in a carrier gas and is intimately contacted with a vaporous combustible stream to form a reactant stream which in turn is ignited to form the metal oxide by direct oxidation of the fluidized metal compound. Vaporous metal halide can be admixed with fluidized metal to simultaneously hydrolyze the halide and oxidize the metal to the corresponding metal oxides. The ignited reactant stream is impinged on a deposition surface to form the metal oxide article of very high purity. In a preferred embodiment fluidized silicon and vaporous silicon tetrachloride are contacted with a stream of elemental hydrogen and elemental oxygen to form a resultant stream which is combusted to form a high purity silicon dioxide article on the deposition surface.

---

This invention relates to the production of metal oxide articles, and more specifically to an improved process for the production of metal oxide articles by direct oxidation of fluidized elemental metal.

Various processes are known in the art which involve the production of metal oxides from vaporous reactants. Briefly these processes include the vapor phase oxidation and hydrolysis of vaporous metal halides. For example, it is known to produce silicon dioxide from the following oxidation and hydrolysis reactions, respectively:

(1) $SiCl_4 + O_2 \rightarrow SiO_2 + Cl_2$ (2) $SiCl_4 + H_2O \rightarrow SiO_2 + HCl$ (3) $SiCl_4 + O_3 \rightarrow SiO_2 + Cl_2$ The conventional vapor phase processes which are utilized to carry out the above three reactions all require the use of burners or jet assemblies for feeding the reactant gases and vapors to a reaction space. A disadvantage of the oxidation reaction which proceeds according to Equation (1) is that it generally is difficult to maintain a reaction temperature at the desired elevated temperature. Therefore, the method is usually complicated with apparatus to maintain the reaction temperature. The reaction which proceeds according to Equation 2 has the disadvantage of producing a very strong acid byproduct which is not only detrimental to many deposition substrates but to reaction equipment. The method of producing silicon dioxide by Equation 3 has an inherent disadvantage in that ozone is required. Ozone is unstable requiring careful handling. In addition, ozone is not commercially available and must be manufactured at the production site of the silicon dioxide, therefore requiring additional equipment and expense. All three of the above reactions have a like disadvantage in that silicon tetrachloride is required as a reactant. Silicon tetrachloride is more expensive than the elemental silicon on a pound per pound yield of silicon dioxide. Likewise, other metal halides can be efficiently and economically replaced by the elemental metal form to produce corresponding metal oxides.

It is therefore desirable to directly oxidize elemental metals to form metal oxides. Heretofore an effective and efficient process has not been available to directly form metal oxides from elemental metals and simultaneously form a metal oxide article therefrom. The invention, therefore, provides a process for making a metal oxide article comprising fluidizing finely divided elemental metal in a carrier gas stream, combining that stream with a combustible gas to form a stream containing oxygen, igniting the resultant stream to produce a metal oxide by direct oxidation and directing the flame toward a deposition surface to form a metal oxide article thereon.

The invention will be more easily understood by reference to the drawings wherein:

FIG. 1 is a partially schematic view illustrating a suitable torch for carrying out the process of this invention;

FIG. 2 is a sectional view of the torch illustrated in FIG. 1 showing connection to the various reactant streams; and FIG. 3 is an end view of the nozzle of FIG. 2 taken along section 3—3.

Now referring to FIG. 1, torch 10 provides a means for admixing the reactants and providing a flame for producing direct oxidation of a finely divided elemental metal to produce a corresponding metal oxide deposit 100 on a substrate such as a mandrel 101, according to this invention.

Any metal known in the art can be used in the practice of this invention. Preferred metals include those of groups II–A, III–A, IV–A, III–B, IV–B, and V–B of the Periodic Table as set forth on page B-2 of The Handbook of Chemistry and Physics, Chemical Rubber Publishing Company, 45th edition, 1964. In a preferred embodiment of this invention, very high purity metal oxide is produced by the direct oxidation of finely divided silicon in a hydrogen and oxygen flame to form silicon dioxide.

The combusting constituents of the combustible gas stream used in this invention are preferably molecular hydrogen and molecular oxygen. However, other combusting constituents can be used within the scope of this invention, such as, for example, a vaporous hydrocarbon and oxygen. Generally any hydrocarbon which has an atmospheric boiling point above that of unleaded gasoline can be utilized. However, it is usually preferred to use the normally vaporous hydrocarbons, such as methane, ethane and propane.

The flame produced from torch 10 is shown diagrammatically as comprising a very hot central portion 102 wherein a finely divided, fluidized metal stream 103 surrounded by an annular relatively inert sheath stream 104 is combined with an annular combustible gas stream 105 at a point 106, such that the intermixing between the combustible gas stream and the finely divided metal there occurs. The resultant mixed stream contains sufficient oxygen to obtain the proper amount of combustion and oxidation to produce the metal oxide. The metal is not allowed to react with the combustible gas stream and oxidize immediately adjacent the face of the nozzle, but rather combines and reacts with the combustible stream at point 106. When the two streams are ignited, the portion 102 is extremely hot. The heat of combustion provides the necessary elevated temperature to rapidly react excess oxygen with the finely divided metal to form the metal oxide.

The hot central portion 102 can be directed toward and upon any suitable deposition surface, such as a graphite surface, capable of receiving a coating of metal oxide. As illustrated, mandrel 101 is rotating and translating. Thus, as mandrel 101 rotates and translates in the directions indicated by the arrows, a layer of high purity metal oxide 100 is formed about the periphery thereof. It is to be noted that any other suitable deposition substrate can be utilized. Additionally, it is within the scope of the invention to deposit a bed of metal oxide with a suitable cavity, such as a reaction chamber, by the process of this invention.

Now referring to FIG. 2, a suitable apparatus for carrying out the process of this invention is illustrated. FIG. 2 includes an improved torch similar to that disclosed in a co-pending application to Herbert J. Moltzan, Ser. No. 744,153, filed July 11, 1968, now abandoned, connected to suitable reactant streams according to this invention. Tube 12, preferably constructed from stainless steel, extends the length of the torch 10 to provide a passage for fluidized metal and vaporized metal halide entrained in a carrier gas. A T-connection, designated generally by 14, is connected about tube 12 and is sealed at one end to tube 12 by a collar member 16. A coupling member 18 fits over a stainless steel tube 20 to provide an annular sheath chamber 22 between the tube 12 and tube 20. An inlet portion 24 of the T-connection 14 is connected to a source of sheath gas as will be described below. This sheath gas is passed into the annular sheath chamber 22.

A mixing chamber 26 is formed by chamber walls 28. An inlet fitting 30 is adapted to be connected to the source of a combustible gas, while the inlet fitting 32 is connected to a source of oxidizing gas. The combustible gases are mixed within chamber 26 in order to limit any possible flashback to the torch housing. An outer annular chamber 34 is formed by annular walls 36 to define a cooling chamber about the torch. An inlet fitting 38 is connected to a suitable supply of cooling fluid, such as water, which is circulated through chamber 34 and exhausted by an outlet fitting 40.

Referring now to FIGS. 2 and 3, nozzle assembly 68 is attached to the face of the torch 10 by screws 70. As illustrated, four screws 70 pass through nozzle assembly 68 and into portions of the walls defining chamber 34. Nozzle assembly 68 comprises a unitary annular member having a center opening 72 for receiving the end of tube 12. The end of tube 12 is closed with the exception of a center nozzle aperture 74 defined therein. Due to the difference in the diameters of tube 12 and tube 20, an annular opening 76 is defined concentrically about nozzle aperture 74. Sheath chamber 22 communicates with the opening 76. A plurality of nozzle openings 78 are defined through nozzle assembly 68. The diameter of these openings is generally the same, or smaller than, the diameter of nozzle aperture 74.

Each of the nozzle openings 78 makes an angle with the axis of the jet stream issuing from nozzle aperture 74. This angle can be varied according to the particular desired results, and is generally within the range of about 2 to 30 degrees. These angled nozzle openings 78 provide a very efficient torch flame for intermixture of the oxidizing flame and the finely divided fluidized metal issuing from aperture 74, and for direct deposition of metal oxides.

In a preferred embodiment as illustrated in the drawing, oxygen is supplied through conduit 42 to the inlet of three flow meters 44, 46 and 48. Nitrogen is supplied via conduit 43 to flow meter 80. Hydrogen is supplied via a conduit 50 to flow meter 52. Suitable valves are provided at the output of each of the flow meters in order to allow accurate regulation of the flow rate of the gases to the torch 10. Oxygen is supplied through conduit 54 to inlet portion 24 of T-connection member 14. Oxygen from flow meter 46 is supplied through a conduit 56 to a bubbler unit 58. The bubbler unit 58 comprises a container filled with liquid metal halide, e.g., silicon tetrachloride, and includes a diffusing element 60 which bubbles the oxygen upwardly through the metal halide, thereby entraining vapors of the metal halide within the oxygen. While a bubbler assembly has been shown, it will be understood that a conventional diffuser type gas source can alternatively be utilized. The gaseous metal halide entrained in the carrier oxygen gas is passed outwardly through conduit 62 to the inlet 110 of T-connection 112 from which it enters tube 12. Oxygen is also supplied from flow meter 48 through conduit 64 to inlet 30 of mixing chamber 26. Additionally, hydrogen is supplied from flow meter 52 through conduit 66 to inlet 32 of mixing chamber 26.

The nitrogen entering flow meter 80 from conduit 42 is regulated by a suitable valve and enters a conventional powder injection system through conduit 82. One type of powder injection system comprises a reservoir or tank 84 having a plate 86 attached at the bottom of the tank to a suitable vibrator 88. Very finely divided metal, e.g. silicon, is fed to the tank 84 through conduit 90. The finely divided metal is ground or pulverized to a particle size sufficiently fine to enable fluidization. A suitable valve means 91 controls the flow of finely divided metal into tank 84. The vibrator in this embodiment is electrically powered and connected to a suitable electrical energy source 92. When the vibrator is activated, the finely divided metal is distributed throughout the tank 84 as indicated by particulate mass 94. The nitrogen fluidizing gas entering tank 84 from conduit 82 passes through the particulate mass 94. As the fluidizing gas passes out of the container into conduit 96, the finely divided metal is entrained. The fluidizing gas with its entrained, finely divided, metal particles then passes from conduit 96 into inlet 98 of T-connection 112. The vaporous metal halide and the fluidized metal are admixed in T-connection 112 and enter tube 12. Nitrogen is used as a carrier gas to prevent premature oxidation of the finely divided metal. It may also be necessary to supply nitrogen to sheath chamber 22 replacing the oxygen in this illustrated embodiment. In a like manner nitrogen carrier gas for the liquid silicon tetrachloride can be substituted for the aforementioned oxygen. Whether this nitrogen substitution is necessary depends upon various factors including the particular metal and its particle size.

In another embodiment of the invention, the flow of oxygen to bubbler unit 58 from flow meter 46 can be completely cut off, causing the flow of vaporous metal halide to T-connection 112 to completely cease. Thus, only fluidized metal is fed to T-connection 112 and hence to tube 12. It can readily be seen that the invention can be utilized to simultaneously hydrolyze a metal halide to a metal oxide and to directly oxidize finely divided metal to a metal oxide. In addition, the method herein set forth can be utilized solely to oxidize pure metal, thus eliminating the need to feed a vaporous metal halide to the torch unit 10.

In operation of torch 10, metal halide entrained in a carrier gas, for example, oxygen, and finely divided metal fluidized in carrier gas, for example, nitrogen, are passed through tube 12 and out nozzle aperture 74 as a gaseous jet stream containing a particulate, fluidized metal. A concentric sheath of oxygen or other relatively inert gas is passed through annular opening 76. Each stream of the combustible mixture of, for example, hydrogen and oxygen, issuing from opening 78 is directed at an angle in the range from about 2° to 30° from the axis of the jet stream for penetration of the gas sheath and interaction with the gaseous metal halide and fluidized metal. When the torch is ignited, combustion occurs at this region of peneration and the metal halide is decomposed by vapor phase hydrolysis to form the corresponding metal oxide. In addition, in accordance with this invention, the fluidized finely divided metal is reacted by direct oxidation to produce the metal oxide. As previously disclosed, the flow of metal halide can be completely stopped, thus feeding only fluidized, finely divided metal to tube 12 and nozzle aperture 74. In this latter instance, metal oxide would be produced solely by direct oxidation of the metal to the metal oxide.

A better understanding of the invention can be gleaned from the following example. It is intended only as an exemplification of the instant invention and is not intended in any way to limit the scope thereof.

EXAMPLE

The system as illustrated in FIG. 2 is utilized in cooperation with a rotating mandrel as illustrated and described in conjunction with FIG. 1. The rotating mandrel is positioned at about 3¼ inches from the end of the nozzle assembly 68. Eight nozzle openings 78 each sloping at 20° toward the longitudinal axis of the torch (the direction at which the combined stream of vaporous metal halide and fluidized metal issue from aperture 74), are provided through nozzle assembly 68, as illustrated in FIGS. 2 and 3. A bubbler unit 58 contains silicon tetrachloride and a powder injection tank 84 contains finely divided silicon metal. Dry oxygen, dry nitrogen and dry hydrogen are supplied to the appropriate metering points.

One liter per minute of oxygen and 1.43 liters per minute of gaseous silicon tetrachloride entrained in the oxygen are fed into T-connection 112. To provide this supply of gas, a conventional bubbler is maintained at a temperature of approximately 50° C. and at a pressure of 5 pounds per square inch. The diameter of the center nozzle aperture of the torch is about 0.063 inch. One liter per minute of oxygen is provided to the torch for use as a sheath gas, while 5.2 liters per minute of oxygen and 30 liters per minute of hydrogen are mixed in the torch to provide the combustion gas. 1.5 grams per minute of finely divided silicon metal is fluidized in one liter per minute of nitrogen, fed to the T-connection 112 as illustrated in FIG. 2, and admixed with the vaporous silicon tetrachloride.

The flame is ignited and directed against the rotating graphite mandrel for about twenty minutes. The resulting flame temperature is about 1500° C. It is found that the conversion of silicon tetrachloride and silicon metal to silicon dioxide is substantially complete.

The above example is repeated except that no vaporous silicon tetrachloride is fed to the torch by draining the bubbler unit 58 of liquid silicon tetrachloride. Thus, all gas flow rates remain the same. It is found that after twenty minutes substantially all of the finely divided silicon metal is directly oxidized to silicon oxide and deposited on the mandrel.

The advantages of this invention are readily seen. As an example in the preferred embodiment described above, the raw material cost of silicon metal (for example, electrometallurgical grade) is considerably less than silicon tetrachloride based on silicon content. This factor reduces the cost of producing silicon dioxide and is especially attractive for making low purity silicon dioxide shapes. Also, the characteristics of the silicon dioxide article produced can be varied by varying the deposition conditions. Additionally, selected impurities can be introduced via tube 12 to the deposition zone. In this way an impure silica article of diverse properties can be produced.

While this invention has been specifically described in relation to the preferred embodiment for making silicon dioxide articles, it is to be understood that the method and apparatus disclosed herein can be utilized to produce other metal oxide articles. Those metals appearing in groups II–A, III–A, IV–A, III–B, IV–B, V–B of the Periodic Table are preferred. Additionally, composite articles can be produced by this invention by introducing a first metal in the form of its metal halide and a second metal in the finely divided elemental state. The proportions of the metals can also be selectively varied during the deposition process to produce an article of desired compositions.

Various other modifications and alternatives will be readily apparent to those skilled in the art upon reading the specification. The specification is intended to cover these diverse modifications as well as those which fall within the scope and spirit of the appended claims.

What is claimed is:

1. A method for producing a metal oxide article comprising the steps of:
    forming a first stream of a vaporous metal halide,
    fluidizing a finely divided metal in a carrier gas to form a second stream,
    combining the first and second streams to form a third stream,
    contacting the third stream with a fourth stream of a combustible gas to form a resultant stream containing the vaporous halide, the finely divided fluidized metal, the combustible gas, and oxygen,
    igniting the resultant stream to form a flame which causes vapor phase hydrolysis of the metal halide and oxidation of the finely divided metal.
    directing the flame onto a deposition surface to form a metal oxide article thereon.

2. The method of claim 1 wherein the combustible gas comprises molecular hydrogen and molecular oxygen.

3. The method of claim 2 wherein the carrier gas is nitrogen.

4. The method of claim 1, wherein the metal of the metal halide and the metal are independently selected from groups II–A, III–A, IV–A, III–B, IV–B, and V–B of the Periodic Table.

5. The method of claim 1 wherein the metal of the metal halide and the elemental metal are the same.

6. The method of claim 4 wherin the metal halide is silicon tetrachloride.

7. The method of claim 4 wherein the elemental metal is silicon.

8. The method of claim 7 wherein the metal halide is silicon tetrachloride.

9. The method of claim 8 wherein the fourth stream is contacted with the third stream at a first selected region and interaction between the third stream and the fourth stream is prevented within a second selected region.

10. The method of claim 9 wherein the interaction is prevented by streaming a supply of initially relatively inert gas between the third stream and the combustible gas stream.

11. The method of claim 10 wherein the fourth stream is slanted toward the axis of the third stream at an angle within the range of about 2° to about 30°.

12. A method of producing a silicon oxide article comprising:
    suspending finely divided silicon metal in a carrier fluid to form a first stream,
    combining said first stream with a combustible mixture of elemental hydrogen and elemental oxygen,
    igniting the second stream to form a flame which causes oxidation of the silicon metal to form silicon oxide,
    selecting the proportions of the reactant gases to produce a flame temperature of about 1500° C.,
    directing the flame toward a surface to deposit the silicon oxide and form an article thereon, and
    separating said article from said surface.

References Cited

UNITED STATES PATENTS

| | | | |
|---|---|---|---|
| 2,976,166 | 3/1961 | White et al. | 117—105.2 X |
| 3,085,865 | 4/1963 | Long et al. | 23—139 X |
| 2,614,995 | 10/1952 | Balthis | 252—313 |
| 2,960,594 | 11/1960 | Thorpe | 117—93.1 PF |
| 3,275,408 | 9/1966 | Winterburn | 23—182 |

OTHER REFERENCES

Kubaschewski et al. Oxidation of Metals and Alloys, Academic Press Inc., New York (1962), pp. 48–49 relied on.

EDWARD G. WHITBY, Primary Examiner

U.S. Cl. X.R.

117—93.1 PF, 117—106 A, 160 R; 264—81